(12) United States Patent
Ferran et al.

(10) Patent No.: US 6,405,684 B1
(45) Date of Patent: Jun. 18, 2002

(54) TURTLE HARVESTING TOOL

(76) Inventors: Robert D. Ferran; Mary B. Ferran, both of 440 N. Marion St.; Robert P. Ferran, 41 Sunset Manor Dr., all of Martinsville, IN (US) 46151; Richard T Ferran, 11153 S. County Rd. 125 East, Cloverdale, IN (US) 46120; Randy D. Ferran, Lot 46 Frakers Trailer Ct, Martinsville, IN (US) 46151; Rodney J. Ferran, 360 W. Harrison St., Martinsville, IN (US) 46151; Scott D. Ferran, 240 W. Highland St., Martinsville, IN (US) 46151

( * ) Notice: Subject to any disclaimer, the term of this patent is extended or adjusted under 35 U.S.C. 154(b) by 20 days.

(21) Appl. No.: 09/641,845

(22) Filed: Aug. 18, 2000

(51) Int. Cl.⁷ .............................. A01K 15/00; E02D 5/74
(52) U.S. Cl. ..................... 119/801; 119/786; 119/788; 135/118; 52/155
(58) Field of Search ................................. 119/801, 786, 119/788; 503/7; 135/17, 65, 66, 67, 74, 75, 76, 78, 118; 52/155

(56) References Cited

U.S. PATENT DOCUMENTS

| | | | |
|---|---|---|---|
| 750,046 A | * 1/1904 | Bevillard | |
| 752,058 A | 2/1904 | Frizell | |
| 828,810 A | * 8/1906 | Bowling et al. | |
| 1,224,533 A | * 5/1917 | Guglielmone | |
| 2,005,507 A | * 6/1935 | Russell et al. | |
| 2,441,689 A | * 5/1948 | Daniel | |
| 2,603,185 A | 7/1952 | Kuhns | |
| 3,863,377 A | 2/1975 | Leonard | |
| 5,044,323 A | * 9/1991 | Papak | 119/786 |
| 5,197,501 A | * 3/1993 | Ragatz | 135/66 |
| 5,228,226 A | 7/1993 | Porosky | |
| D363,246 S | 10/1995 | Angles | |
| 5,548,917 A | 8/1996 | Holwadel | |
| 5,651,565 A | * 7/1997 | Liu | 280/823 |
| 5,775,352 A | * 7/1998 | Obitts | 135/69 |
| 5,996,602 A | * 12/1999 | Cato, III | 135/75 |

* cited by examiner

Primary Examiner—Yvonne R. Abbott

(57) ABSTRACT

A turtle harvesting tool for locating and retrieving turtles from marshes. The turtle harvesting tool includes a rod having a first end and a second end. The first end is generally pointed. The rod has an arc therein such that a hook is defined. The arc is located nearer the second end than the first end. The rod has a break therein generally located between the first and second ends such that a first portion and a second portion of the rod are defined. A coupling member removably engages an end of the first portion to an end of the second portion.

10 Claims, 2 Drawing Sheets

TURTLE HARVESTING TOOL

BACKGROUND OF THE INVENTION

1. Field of the Invention

The present invention relates to tools for harvesting turtles and more particularly pertains to a new turtle harvesting tool for locating and retrieving turtles from marshes.

2. Description of the Prior Art

The use of tools for harvesting turtles is known in the prior art. More specifically, tools for harvesting turtles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,548,917; U.S. Pat. No. 5,228,226; U.S. Pat. No. 3,863,377; U.S. Des. Pat. No. 363,246; U.S. Pat. No. 2,603,185; and U.S. Pat. No. 752,058.

While these devices fulfill their respective, particular objectives and requirements, the aforementioned patents do not include a rod having a first end and a second end. The first end is generally pointed. The rod has an arc therein such that a hook is defined. The arc is located nearer the second end than the first end. The rod has a break therein generally located between the first and second ends such that a first portion and a second portion of the rod are defined. A coupling member removably engages an end of the first portion to an end of the second portion.

In these respects, the turtle harvesting tool according to the present invention substantially departs from the conventional concepts and designs of the prior art, and in so doing provides an apparatus primarily developed for the purpose of locating and retrieving turtles from marshes.

SUMMARY OF THE INVENTION

In view of the foregoing disadvantages inherent in the known types of tools for harvesting turtles now present in the prior art, the present invention provides a new turtle harvesting tool construction wherein the same can be utilized for locating and retrieving turtles from marshes.

The general purpose of the present invention, which will be described subsequently in greater detail, is to provide a new turtle harvesting tool apparatus and method which has many of the advantages of the tools for harvesting turtles mentioned heretofore and many novel features that result in a new turtle harvesting tool which is not anticipated, rendered obvious, suggested, or even implied by any of the prior art tools for harvesting turtles, either alone or in any combination thereof.

To attain this, the present invention generally comprises a rod having a first end and a second end. The first end is generally pointed. The rod has an arc therein such that a hook is defined. The arc is located nearer the second end than the first end. The rod has a break therein generally located between the first and second ends such that a first portion and a second portion of the rod are defined. A coupling member removably engages an end of the first portion to an end of the second portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new turtle harvesting tool apparatus and method which has many of the advantages of the tools for harvesting turtles mentioned heretofore and many novel features that result in a new turtle harvesting tool which is not anticipated, rendered obvious, suggested, or even implied by any of the prior art tools for harvesting turtles, either alone or in any combination thereof.

It is another object of the present invention to provide a new turtle harvesting tool which may be easily and efficiently manufactured and marketed.

It is a further object of the present invention to provide a new turtle harvesting tool which is of a durable and reliable construction.

An even further object of the present invention is to provide a new turtle harvesting tool which is susceptible of a low cost of manufacture with regard to both materials and labor, and which accordingly is then susceptible of low prices of sale to the consuming public, thereby making such turtle harvesting tool economically available to the buying public.

Still yet another object of the present invention is to provide a new turtle harvesting tool which provides in the apparatuses and methods of the prior art some of the advantages thereof, while simultaneously overcoming some of the disadvantages normally associated therewith.

Still another object of the present invention is to provide a new turtle harvesting tool for locating and retrieving turtles from marshes.

Yet another object of the present invention is to provide a new turtle harvesting tool which includes a rod having a first end and a second end. The first end is generally pointed. The rod has an arc therein such that a hook is defined. The arc is located nearer the second end than the first end. The rod has a break therein generally located between the first and second ends such that a first portion and a second portion of the rod are defined. A coupling member removably engages an end of the first portion to an end of the second portion.

Still yet another object of the present invention is to provide a new turtle harvesting tool that has a handle portion for easy use of the device.

Even still another object of the present invention is to provide a new turtle harvesting tool that is separable into two portions for easy storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
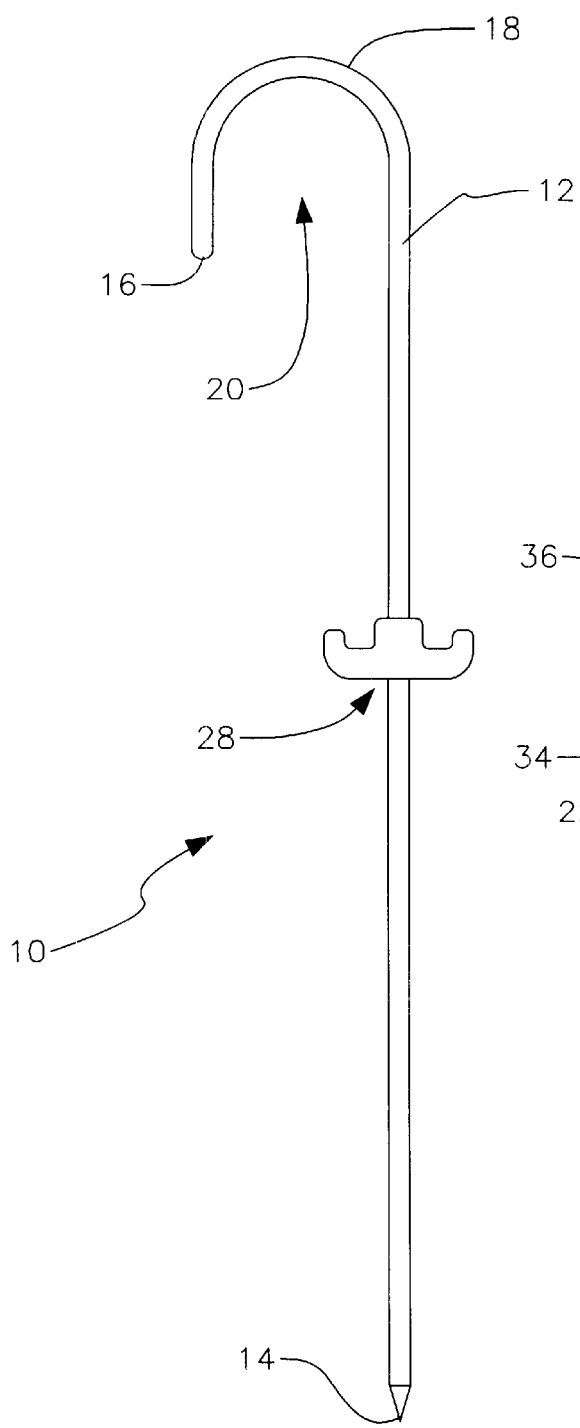
FIG. 1 is a schematic side view of a new turtle harvesting tool according to the present invention.
Figure 2:
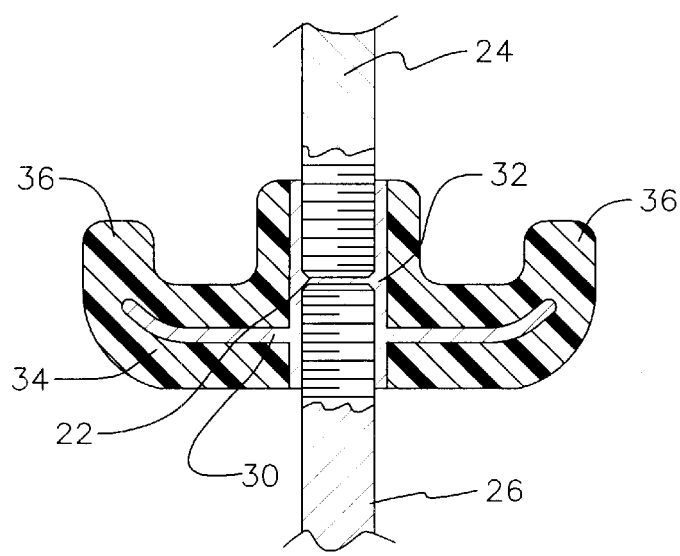
FIG. 2 is a schematic cross-sectional view of the coupling member of the present invention.
Figure 3:
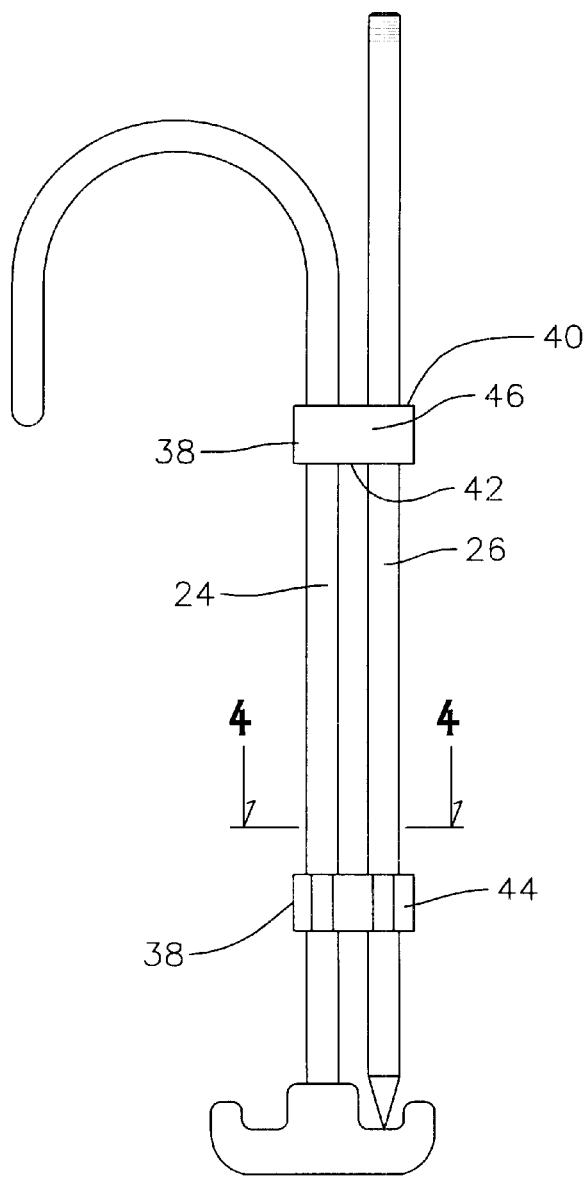
FIG. 3 is a schematic side view of the present invention.
Figure 4:
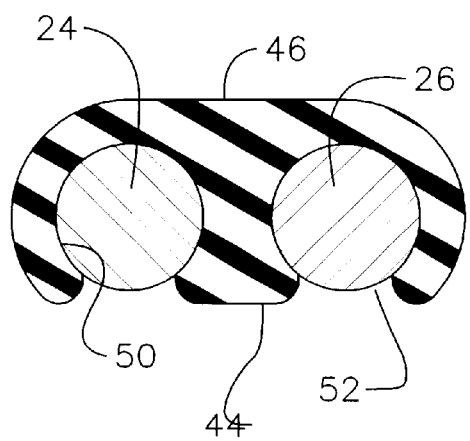
FIG. 4 is a schematic cross-sectional view taken along line 4—4 of the present invention.

With reference now to the drawings, and in particular to FIGS. 1 through 4 thereof, a new turtle harvesting tool embodying the principles and concepts of the present invention and generally designated by the reference numeral 10 will be described.

As best illustrated in FIGS. 1 through 4, the turtle harvesting tool 10 generally comprises a rod 12. The rod 12 has a first end 14 and a second end 16. The first end 14 is generally pointed. The rod 12 has an arc 18 therein such that a hook 20 is defined. The arc 18 is located nearer the second end 16 than the first end 14. The rod 12 has a break 22 therein generally located between the first 14 and second 16 ends such that a first portion 24 and a second portion 26 of the rod 12 are defined. The rod 12 preferably has length generally between 4 feet and 6 feet. The rod 12 preferably has a width generally between ¼ inch and 1 inch.

A coupling member 28 removably engages an end of the first portion 24 to an end of the second portion 26. The coupling member 28 comprises a plate 30. The plate 30 has a cylinder 32 extending therethrough. The cylinder 32 has a threaded inner surface. Each of the first 24 and second 26 portions has a threaded end adapted for releasably engaging the threads in the cylinder 32.

A covering member 34 covers the coupling member. The covering member 34 generally encompasses an outer surface of the plate 30 and the cylinder 32. A pair of protruding members 36 extends upwardly from and is integrally coupled to the covering member 34. Each of the protruding members 36 is on an opposite end of the covering member and acts as a handle for using the rod 12. The covering member preferably comprises a plastic material.

Each of a pair of a bracket members 38 has a top side 40, a bottom side 42, a front side 44 and a back side 46. Each of the bracket members 38 has a pair of holes 50 extending through the top 40 and bottom 42 sides. Each of the front sides 44 has a pair of elongate channels 52 extending between the top 40 and bottom 42 sides. Each of the elongate channels 52 extends into one of holes 50. Each of the rod portions 24, 26 is positionable in one of the holes 50 such that the first 24 and second 26 portions are removably coupled to each other. Each of the bracket members 38 preferably comprises an elastomeric material.

In use, the user couples the first portion to the second portion. The first end 14 is pressed through the soft ground of a marsh to located hibernating turtles. When one is located, the second end 16 of the rod 12 acts like a hook to pull the turtle upwards. When not in use, the bracket members 38 allow the user to store the two portions 24, 26 side by side.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A turtle locating device, said device comprising:
   a rod, said rod having a first end and a second end, said first end being generally pointed, said rod having an arc therein such that a hook is defined, said arc being located nearer said second end than said first end, said rod having a break therein, said break being generally located between said first and second ends such that a first portion and a second portion of said rod are defined; and
   a coupling member for removably engaging an end of said first portion to an end of said second portion, said coupling member comprising a plate having a cylinder extending therethrough, said cylinder having a threaded inner surface, each of said first and second portions having a threaded end adapted for releasably engaging said threads in said cylinder.

2. The turtle locating device as in claim 1, wherein said rod has length generally between 4 feet and 6 feet, said rod having a width generally between ¼ inch and 1 inch.

3. The turtle locating device as in claim 1, further including a covering member for covering said coupling member, said covering member generally encompassing an outer surface of said plate and said cylinder, a pair of protruding members extending upwardly from and integrally coupled to said covering member, each of said protruding members being on an opposite end of said covering member.

4. The turtle locating device as in claim 3, further including a pair of a bracket members, each of said bracket members having a top side, a bottom side, a front side and a back side, each of said bracket members having a pair of holes extending through said top and bottom sides, each of said front sides having a pair of elongate channels extending between said top and bottom sides, each of said elongate channels extending into one of holes, wherein each of said portions are positionable in one of said holes such that said first and second portions are removably coupled to each other, each of said bracket members comprising an elastomeric material.

5. The turtle locating device as in claim 1, further comprising:

a pair of a bracket members, each of said bracket members having a top side, a bottom side, a front side and a back side, each of said bracket members having a pair of holes extending through said top and bottom sides, each of said front sides having a pair of elongate channels extending between said top and bottom sides, each of said elongate channels extending into one of holes, wherein each of said portions are positionable in one of said holes such that said first and second portions are removably coupled to each other, each of said bracket members comprising an elastomeric material.

6. A turtle locating device, said device comprising:

a rod having a first end and a second end, said first end being generally pointed, said rod having an arc therein such that a hook is defined, said arc being located nearer said second end than said first end, said rod having a break therein, said break being generally located between said first and second ends such that a first portion and a second portion of said rod are defined, said rod having length generally between 4 feet and 6 feet, said rod having a width generally between ¼ inch and 1 inch;

a coupling member for removably engaging an end of said first portion to an end of said second portion, said coupling member comprising a plate, said plate having a cylinder extending therethrough, said cylinder having a threaded inner surface, each of said first and second portions having a threaded end adapted for releasably engaging said threads in said cylinder;

a covering member for covering said coupling member, said covering member generally encompassing an outer surface of said plate and said cylinder, a pair of protruding members extending upwardly from and integrally coupled to said covering member, each of said protruding members being on an opposite end of said covering member, said covering member comprising a plastic material; and a pair of a bracket members, each of said bracket members having a top side, a bottom side, a front side and a back side, each of said bracket members having a pair of holes extending through said top and bottom sides, each of said front sides having a pair of elongate channels extending between said top and bottom sides, each of said elongate channels extending into one of holes, wherein each of said portions are positionable in one of said holes such that said first and second portions are removably coupled to each other, each of said bracket members comprising an elastomeric material.

7. A turtle locating device, said device comprising:

a rod having a first end and a second end, said first end being generally pointed, said rod having an arc therein such that a hook is defined, said arc being located nearer said second end than said first end, said rod having a break therein, said break being generally located between said first and second ends such that a first portion and a second portion of said rod are defined;

a coupling member for removably engaging an end of said first portion to an end of said second portion; and a pair of a bracket members, each of said bracket members having a top side, a bottom side, a front side and a back side, each of said bracket members having a pair of holes extending through said top and bottom sides, each of said front sides having a pair of elongate channels extending between said top and bottom sides, each of said elongate channels extending into one of holes, wherein each of said portions are positionable in one of said holes such that said first and second portions are removably coupled to each other, each of said bracket members comprising an elastomeric material.

8. The turtle locating device as in claim 7, wherein said rod has a length generally between 4 feet and 6 feet, said rod having a width generally between ¼ inch and 1 inch.

9. The turtle locating device as in claim 7, further including a plate having a cylinder extending therethrough, said cylinder having a threaded inner surface, each of said first and second portions having a threaded end adapted for releasably engaging said threads in said cylinder.

10. The turtle locating device as in claims 7, further including a covering member for covering said coupling member, said covering member generally encompassing an outer surface of said plate and said cylinder, a pair of protruding members extending upwardly from and integrally coupled to said covering member, each of said protruding members being on an opposite end of said covering member.

* * * * *